(12) United States Patent
Colin et al.

(10) Patent No.: US 10,020,690 B2
(45) Date of Patent: Jul. 10, 2018

(54) DEVICE FOR REMOTE TRANSFER OF ENERGY TO A MOVING OBJECT BY ACOUSTIC WAVES

(71) Applicant: Airbus SAS, Paris (FR)

(72) Inventors: Nicolas Colin, Toulouse (FR); Didier Simonet, Léguevin (FR)

(73) Assignee: AIRBUS SAS (FR)

( * ) Notice: Subject to any disclaimer, the term of this patent is extended or adjusted under 35 U.S.C. 154(b) by 72 days.

(21) Appl. No.: 15/033,960

(22) PCT Filed: Oct. 30, 2014

(86) PCT No.: PCT/EP2014/073363
§ 371 (c)(1),
(2) Date: May 3, 2016

(87) PCT Pub. No.: WO2015/063223
PCT Pub. Date: May 7, 2015

(65) Prior Publication Data
US 2016/0276863 A1 Sep. 22, 2016

(30) Foreign Application Priority Data
Nov. 4, 2013 (FR) .................................... 13 60761

(51) Int. Cl.
*H01F 27/42* (2006.01)
*H02J 50/15* (2016.01)
(Continued)

(52) U.S. Cl.
CPC ............ *H02J 50/15* (2016.02); *B64C 39/024* (2013.01); *G01S 19/13* (2013.01); *H02J 7/025* (2013.01);
(Continued)

(58) Field of Classification Search
CPC ....................................................... H02J 7/025
See application file for complete search history.

(56) References Cited

U.S. PATENT DOCUMENTS

| | | | |
|---|---|---|---|
| 6,798,716 B1 * | 9/2004 | Charych | H02J 17/00 367/119 |
| 2009/0314883 A1 | 12/2009 | Arlton et al. | |

(Continued)

OTHER PUBLICATIONS

International Search Report, International Application No. PCT/EP2014/073363, dated Dec. 8, 2014.

(Continued)

*Primary Examiner* — Daniel Puentes
(74) *Attorney, Agent, or Firm* — Lerner, David, Littenberg, Krumholz & Mentlik, LLP

(57) ABSTRACT

The invention consists of a system allowing remote wireless transfer of energy from a base station to a moving object, in particular a drone, moving in a given zone around the base station. The system includes means for tracking the moving object so as to determine the position of the moving object relative to the base station at any time, means for transmitting a synthetic acoustic wave focused in the direction of the moving object, these two means being located at the base station and powered by the base station, and acoustic reception means, located on the moving object, for receiving the acoustic wave transmitted by the base station and converting the received acoustic wave into an electrical signal and then into a power supply voltage for a battery.

14 Claims, 1 Drawing Sheet

(51) Int. Cl.
  *H02J 50/80*   (2016.01)
  *B64C 39/02*   (2006.01)
  *H02J 17/00*   (2006.01)
  *H02J 7/02*    (2016.01)
  *H02J 50/10*   (2016.01)
  *G01S 19/13*   (2010.01)

(52) U.S. Cl.
  CPC .............. *H02J 17/00* (2013.01); *H02J 50/10* (2016.02); *H02J 50/80* (2016.02); *B64C 2201/042* (2013.01); *B64C 2201/066* (2013.01); *B64C 2201/145* (2013.01)

(56) References Cited

U.S. PATENT DOCUMENTS

| | | |
|---|---|---|
| 2011/0266995 A1 | 11/2011 | Winfield et al. |
| 2012/0150364 A1 | 6/2012 | Tillotson et al. |
| 2012/0155220 A1 | 6/2012 | Lee et al. |
| 2012/0299540 A1 | 11/2012 | Perry |

OTHER PUBLICATIONS

Roes, et al "Contactless Energy Transfer Through Air by Means of Ultrasound"; INSPEC, Jan. 1, 2011; The Institution of Electrical Engineers, Stevenage, GB—ISBN 1-61284-972-0 ; ISBN 284-972-3, XP002731368.

* cited by examiner

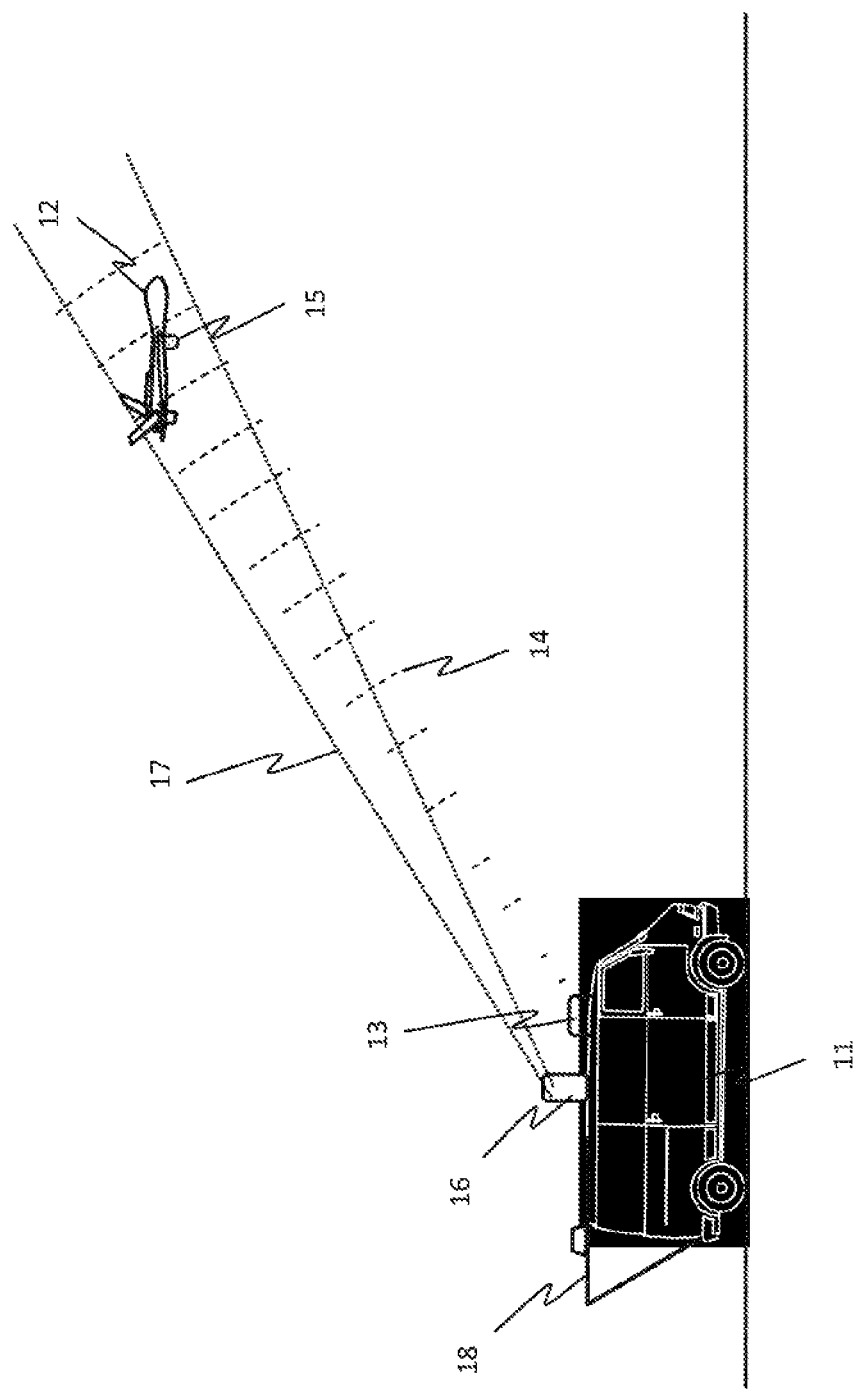

DEVICE FOR REMOTE TRANSFER OF ENERGY TO A MOVING OBJECT BY ACOUSTIC WAVES

CROSS REFERENCE TO RELATED APPLICATIONS

This application is the National Stage of International Application No. PCT/EP2014/073363, having an International Filing Date of 30 Oct. 2014, which designated the United States of America, and which International Application was published under PCT Article 21(2) as WO Publication No. 2015/063223 A1, and which claims priority from, and the benefit of, French Application No. 1360761, filed on 4 Nov. 2013, the disclosures of which are incorporated herein by reference in their entireties.

BACKGROUND

1. Field

The presently disclosed embodiment relates to the general field of means for transferring energy from a producing source to a receiver. It more specifically relates to the field of means for remotely charging batteries.

2. Brief Description of Related Developments

The use of autonomous mobile devices supplied with electrical power by batteries is nowadays becoming widespread. There remain, however, significant problems to be solved in this field concerning autonomy. Specifically, taking into account the dimensions of the object in question and its electrical power consumption, the implementation of a battery conferring sufficient energy autonomy to this object is sometimes difficult to achieve, the desired autonomy requiring a battery whose dimensions are not compatible with those of the object.

Consequently, when designing such objects, it is generally necessary to reach a compromise between the desired autonomy and the dimensions, or mass, of the object. This compromise demands that the object in question be capable of finding a power supply source in the area in which it is moving, failing which the object is taken out of service. Moreover, this source must be capable of charging the battery supplying power to the object in a timescale that is compatible with the conditions of use of this object.

To solve this problem, a known solution consists in making battery swapping stations available to users, these stations being widely distributed across the movement area of the objects and having a wide range of batteries available in order to cater to the wide range of supply voltages of these objects (DC or AC).

An alternative solution consists in making charging points available to users, these charging points being suitable for the objects in question and their usage, cell phones, laptop computers or automotive vehicles, in particular. However, owing to the mobile character of these objects and the wide range of supply voltages of these objects, it is necessary to reduplicate the charging points or, failing that, to implement "universal" charging points that are capable of charging a wide range of objects in timescales compatible with their conditions of use.

Another alternative solution consists in equipping the object in question with portable or transportable charging means, a charger, depending on the case, allowing the user to charge the battery of the object from a standard electrical power supply source, such as the mains voltage, so that due to wide distribution of the mains voltage, there is no need to implement tailored charging points. However, such a solution demands that the user transport the charger of the object. It also demands that the mains voltage be sufficiently high to allow quick charging.

Besides the constraints described above, the three solutions described in the preceding paragraphs furthermore generally demand that the user place the object in question in the vicinity of the power supply source. Specifically, charging is generally carried out by means of an electrical cable, which is necessarily of limited length, or, alternatively, by means of an induction transfer device that requires that the object be placed facing an inductive element that is itself placed in the vicinity of the source to which it is connected. The mobile object is thereby immobilized for the duration of charging.

SUMMARY

An aim of the presently disclosed embodiment is to propose a solution that allows a mobile object, moving in a given area, to be charged with electrical power without having to be located in the immediate vicinity of an electrical charging source and to remain there for the required charging time.

To this end, a subject of the presently disclosed embodiment is a system for remotely and wirelessly transferring energy from a base station to a mobile object moving in a given area of space around said base station, comprising:

means for emitting a synthetic acoustic wave that is focused in a given direction, which means being located at the level of the base station and supplied with power by the latter;

acoustic receiving means, located at the level of the mobile object, for receiving the acoustic wave emitted by the base station and for converting the acoustic wave to an electrical signal.

The system additionally comprises means for tracking the mobile object so as to determine the position of the mobile object with respect to the base station.

According to the envisaged aspect, the device according to the presently disclosed embodiment may have various technical features such as those mentioned below, these features being able to be considered separately or in combination. Thus:

According to one technical feature of the presently disclosed embodiment, the means for emitting the acoustic wave are composed of an assembly of elementary piezoelectric transducers, each transducer being excited by an electrical signal that is phase referenced with respect to a reference phase. The phases of the signals applied to the various piezoelectric transducers are determined in real time, depending on the position of the mobile object relative to the base station, in such a way that the acoustic waves emitted by the various transducers are combined in space so as to form an acoustic wave that is focused in the direction of the mobile object.

According to another technical feature of the presently disclosed embodiment, the acoustic receiving means are composed of a localized acoustic transducer.

According to one aspect of the presently disclosed embodiment, the tracking means implement an optical or radio detection system.

According to another aspect of the presently disclosed embodiment, the mobile object comprises means for converting the electrical signal, sent by the acoustic receiving means, to a continuous voltage allowing a battery housed in said mobile object to be supplied with power.

According to another technical feature of the presently disclosed embodiment, the tracking means are composed of a GPS receiver that is located in the mobile object, and communication means allowing it to transmit its GPS position to the base station.

According to another aspect of the presently disclosed embodiment, the device comprises communication means that allow the base station to guide the mobile object toward an area of space allowing the tracking of the mobile object to be initialized.

DESCRIPTION OF THE DRAWINGS

The features and advantages of the presently disclosed embodiment will be better appreciated by virtue of the following description, which description being supported by the appended FIG. 1 that presents an illustration of an exemplary implementation of the method according to the presently disclosed embodiment for charging a flying mobile object, a drone for example, via a mobile terrestrial base.

DETAILED DESCRIPTION

The present description presents, in a non-limiting manner, an exemplary application of the device according to the presently disclosed embodiment, allowing the advantageous technical features thereof to be highlighted. The presented configuration allows the device according to the presently disclosed embodiment to be implemented across one or more autonomous mobile objects.

The configuration presented here consists of a mobile base station 11 mounted on a vehicle of suitable size that carries out various tasks, associated with an automated flying object 12, a drone, that carries out tasks that are more or less directly linked to those carried out by the base station.

The base station 11 may thus, for example, consist of one or more vehicles that are responsible for carrying out certain tasks on the ground at different points in a given geographical area, while a function of the drone 12 is to explore the area above the ground in order to identify the places where said tasks are to be carried out and to transmit the coordinates of these places to the base station 11, or even in order no autonomously carry out certain tasks in places that are located at height with respect to the ground.

In its most general form intended for applications such as that illustrated by FIG. 1, the device according to the presently disclosed embodiment mainly comprises a base station, a vehicle-mounted mobile station 11 for example, that produces an acoustic energy signal from an electrical power supply source and emits the produced acoustic signal in the form of an acoustic wave 14 that is focused in a given sector of space. To this end the vehicle is equipped with autonomous means for producing electricity (not illustrated in the FIGURE), an engine-generator, for example.

It also comprises an acoustic receiver 15 that is located in the flying mobile object 12, the drone, which transforms the received acoustic wave 14 into an electrical signal, and means that are capable of converting this electrical signal to a voltage that is mainly intended for charging a battery that is also located in the drone 12.

According to the presently disclosed embodiment, the acoustic wave emitted by the acoustic emitter of the device is a wave that is permanently directed at the mobile object 12 throughout the operation of charging the latter with power. To this end, this emitter comprises an antenna 13 (i.e. an acoustic projector) configured to radiate a focused wave 14.

Such an antenna may, in a known manner, take various forms. However, in one preferred aspect, the antenna used is a synthetic acoustic antenna composed, for example, of a multiple-element transducer (E) composed of piezoelectric chips that are distributed according to a two-dimensional matrix and form the same number of elementary piezoelectric transducers. In this case, the acoustic emitter also comprises means for generating the electrical signals for exciting the elementary transducers, each of these signals corresponding to a signal derived from a reference signal, obtained by applying a given phase shift to this reference. In a known manner, the applied phase shift for each of the transducers, or phase law, is determined in such a way that the acoustic waves emitted by the various transducers are combined in space so as to form an acoustic wave 14 that is focused in the direction of the mobile object 12, as illustrated by FIG. 1.

According to the presently disclosed embodiment, the acoustic receiver 15 located at the level of the mobile object 12, the drone, is, for its part, a single acoustic transducer that is capable of converting the acoustic wave it receives to an electrical signal. This may be, for example, a localized element of piezoelectric microphone type, without any particular directivity.

The acoustic wave 14 emitted by the base station 11 is a continuous sine wave or, alternatively, a sinusoidal pulse train whose frequency is preferably located in a range varying from a few kHz to a few hundred kHz (up to MHz). The emitted acoustic power is furthermore defined by taking into account the extent of the area of space in which it is desired to make it possible to charge the batteries supplying power to the mobile object 12, a drone in the case of FIG. 1. However, it should be noted that insofar as the drone is not directly supplied with power by means of the electrical signal obtained from the acoustic wave 14, it is the transmitted energy, rather than the power, that represents the factor deciding the dimensions of the emitted acoustic wave (maximum power, waveform, etc.). Advantageously, focusing the wave 14 in the exact direction of the drone 12 allows the transfer of energy, and consequently the horizon of the area in which it is possible to charge the battery of the drone 12, to be optimized. This area typically extends from a few meters to a few hundred meters around the base station borne by the vehicle 11.

Insofar as the acoustic emission 14 is a focused emission, in order to make it possible, to a certain extent, to charge the mobile object 12 with power while the latter, as well as, potentially, the base station 11, are in motion the device according to the presently disclosed embodiment comprises localization and tracking means 16. These means allow, on the one hand, the mobile object 12 to be localized and whether the latter is located in the useful charging area to be determined and, on the other hand, the relative movements of the mobile object 12 and the base station 11 to be followed. They thereby allow the position of the mobile object 12 with respect to the acoustic emitter 13 of the base station 11 to be determined in real time, so that the emitted acoustic wave 14 is kept focused in the direction of the mobile object 12.

The term "useful charging area" here refers to the area of space within which, taking into account any masks that may potentially prevent the propagation of the acoustic wave, the energy transmitted by the acoustic wave 14 is sufficient to be detected by the transducer 15 equipping the mobile object 12.

Tracking is here carried out by any known means 16, optical (camera, laser aiming) or electromagnetic (radar aiming) means, for example.

Alternatively, it may be carried out, as for localization, on the basis of position measurements provided by a GPS receiver that is incorporated in the mobile object 12, these coordinates being transmitted to the base station 11 by radio means (not shown in the FIGURE) that link the mobile object to the base station, for example.

Thus, the device according to the presently disclosed embodiment is able, at any given moment, to determine the position of the mobile object 12 with respect to the base station 11 and, insofar as the position of the latter is within the useful charging area (useful area), to focus the acoustic charging wave 14 in the exact direction of the mobile object 12. Focusing in the direction of the mobile object 12 is obtained simply by applying the appropriate phase law to the excitation electrical signal that controls each of the elementary transducers of the acoustic emitting antenna 13.

According to the presently disclosed embodiment, the function for charging the mobile object 12 may be exercised in permanence as long as it is permanently moving in the useful area, or else intermittently when it is moving within this area.

In the latter case, if, for operational reasons, the mobile object 12 has cause to leave the useful area, the charging operation is interrupted and is only resumed when taking into account the position of the mobile object 12, the tracking of and focusing 17 of the acoustic wave on the latter becomes possible again and/or its distance from the base station 11 is compatible with a satisfactory transfer of energy.

This is especially the case when the vehicle bearing the base station 11 and the mobile object 12 are two elements in a system for monitoring the integrity of large and high structures, buildings, bridges or other civil engineering structures for example, for which monitoring is simultaneously carried out from the ground for low portions and by means of a flying craft 12 for raised portions. In such a context it is indeed possible that, at a given moment in the monitoring operation, the area of movement of the mobile object 12, which constitutes the element for monitoring the higher portions, is not included in the useful charging area or else that, due to the form of the structure being monitored, the acoustic receiver 15 of the mobile object 12 is no longer able to receive the acoustic wave 14 emitted by the base station 11.

It should be noted that, in particular in the case in which the base station 11 is mounted in its vehicle and the mobile object 12 constitutes an assembly of devices that are intended to fulfill additional tasks in one and the same geographical area, it may be advantageous, insofar as the respective dimensions and configurations of the two elements allow, to provide, as illustrated in FIG. 1, a docking area 18 for the mobile object 12 on the base station vehicle, which area the former may occupy when the two elements are not in operation.

In such a configuration, the acoustic emitter 13 of the device according to the presently disclosed embodiment may then be configured in such a way that, when the mobile object 12 is placed on its docking area 18, the acoustic wave 14 is emitted more widely and that it reaches the docking space 10 of the mobile object 18 on the vehicle. For this it is sufficient to apply an appropriate phase law to the various elementary transducers that form the acoustic emitting antenna 13. The loss of power as a consequence of defocusing is offset by the small distance separating the acoustic emitter located on the base station 11 and the acoustic receiver 15 located on the mobile object 12, so that the battery of the mobile object may be charged while the latter is not in operation and its power consumption is low.

It should also be noted that while, in the disclosed embodiment described above, the device according to the presently disclosed embodiment comprises a single mobile base station 11, it may nonetheless, in other aspects, comprise multiple base stations 11 that are fixed or mobile, that each produce an acoustic energy signal and that emit an acoustic wave 14 focused on one and the same mobile object 12. In this way, while a relatively low level of energy is transferred per base station, it is nevertheless possible to transfer sufficient energy to the mobile object 12 to allow it to charge its battery.

It should once again be noted that, in its simplest form that is intended, for example, for the transfer of energy from a fixed base station to a mobile object transported by an individual (e.g. a cell phone), the device according to the presently disclosed embodiment may simply consist of a fixed base station producing an acoustic energy signal on the basis of an electrical signal and emitting the produced acoustic signal in the form of an acoustic wave focused in a given sector of space, and of an acoustic receiver that is located in the mobile object in question and is capable of transforming the received acoustic wave into a voltage that is mainly intended for charging a battery that is also located in the mobile object. In this case, the supply of electrical power to the base station may be provided by the general electricity distribution grid.

As a result, charging the battery may be carried out in a simple manner, the user of the object just having to identify the presence of a base station and place the object to be charged in the propagation area of the acoustic wave, which area being known per se or clearly marked.

As the correct positioning of the mobile object with respect to the source of the acoustic emission is carried out by the operator himself, the device then requires no automated means for tracking or communication between the base station and the mobile object.

What is claimed is:

1. A system for remotely and wirelessly transferring energy from a base station to a mobile object moving in a given area of space around the base station, comprising:
    means for emitting a synthetic acoustic wave that is focused in a given direction, which means being located at the level of the base station and supplied with power by the base station, wherein the means for emitting the acoustic wave are composed of an assembly of elementary piezoelectric transducers, each transducer being excited by an electrical signal that is phase referenced with respect to a reference phase, the phases of the signals applied to the various piezoelectric transducers being determined in real time, depending on the position of the mobile object relative to the base station, in such a way that the acoustic waves emitted by the various transducers are combined in space so as to form an acoustic wave that is focused in the direction of the mobile object;
    acoustic receiving means, located at the level of the mobile object, for receiving the acoustic wave emitted by the base station and for converting the acoustic wave to an electrical signal;
    means for tracking the mobile object so as to determine the position of the mobile object with respect to the base station.

2. The system as claimed in claim 1, wherein the acoustic receiving means are composed of a localized acoustic transducer.

3. The system as claimed in claim 1, wherein the tracking means implement an optical or radio detection system.

4. The system as claimed in claim 1, wherein the tracking means are composed of a GPS receiver that is located in the mobile object, and communication means allowing it to transmit its GPS position to the base station.

5. The system as claimed in claim 1, wherein the mobile object further comprises means for converting the electrical signal, sent by the acoustic receiving means, to a continuous voltage allowing a battery housed in the mobile object to be supplied with power.

6. The system as claimed in claim 1, further comprises communication means that allow the base station to guide the mobile object toward an area of space allowing the tracking of the mobile object to be initialized.

7. A system for remotely and wirelessly transferring energy from a base station to a mobile object moving in a given area of space around the base station, comprising:
    means for emitting a synthetic acoustic wave that is focused in a given direction, which means being located at the base station and supplied with power by the base station;
    acoustic receiving means, located at the level of the mobile object, for receiving the acoustic wave emitted by the base station and for converting the acoustic wave to an electrical signal;
    means for tracking the mobile object so as to determine the position of the mobile object with respect to the base station; and
    communication means that allow the base station to guide the mobile object toward an area of space allowing the tracking of the mobile object to be initialized.

8. The system of claim 7, wherein the means for emitting the acoustic wave are composed of an assembly of elementary piezoelectric transducers, each transducer being excited by an electrical signal that is phase referenced with respect to a reference phase;
    the phases of the signals applied to the various piezoelectric transducers being determined in real time, depending on the position of the mobile object relative to the base station, in such a way that the acoustic waves emitted by the various transducers are combined in space so as to form an acoustic wave that is focused in the direction of the mobile object.

9. The system of claim 7, wherein the acoustic receiving means are composed of a localized acoustic transducer.

10. The system of claim 7, wherein the tracking means implement an optical or radio detection system.

11. The system of claim 7, wherein the tracking means are composed of a GPS receiver that is located in the mobile object, and communication means allowing it to transmit its GPS position to the base station.

12. The system of claim 7, wherein the mobile object further comprises means for converting the electrical signal, sent by the acoustic receiving means, to a continuous voltage allowing a battery housed in the mobile object to be supplied with power.

13. A device for remotely and wirelessly transferring energy from a base station to a mobile object moving in a given area of space around the base station, comprising:
    means for emitting a synthetic acoustic wave that is focused in a given direction and receivable by the mobile object to power the mobile object, which means being located at the base station and supplied with power by the base station, wherein the means for emitting the acoustic wave are composed of an assembly of elementary piezoelectric transducers, each transducer being excited by an electrical signal that is phase referenced with respect to a reference phase, the phases of the signals applied to the various piezoelectric transducers being determined in real time, depending on the position of the mobile object relative to the base station;
    means for tracking the mobile object so as to determine the position of the mobile object with respect to the base station.

14. The device of claim 13, further comprises communication means that allow the base station to guide the mobile object toward an area of space allowing the tracking of the mobile object to be initialized.

* * * * *